United States Patent
Li et al.

(10) Patent No.: US 10,063,161 B2
(45) Date of Patent: Aug. 28, 2018

(54) ACTIVE NEUTRAL POINT CLAMPED CONVERTER CONTROL SYSTEM AND METHOD

(71) Applicant: ABB Schweiz AG, Baden (CH)

(72) Inventors: Jun Li, Cary, NC (US); Kee Ho Shin, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/296,277

(22) Filed: Oct. 18, 2016

(65) Prior Publication Data

US 2018/0109201 A1    Apr. 19, 2018

(51) Int. Cl.
*H02M 7/487* (2007.01)
*H02P 9/00* (2006.01)
*H02K 7/18* (2006.01)
*F03D 9/00* (2016.01)
*F03D 7/04* (2006.01)
*F03D 17/00* (2016.01)

(52) U.S. Cl.
CPC .......... *H02M 7/487* (2013.01); *F03D 7/042* (2013.01); *F03D 9/003* (2013.01); *F03D 17/00* (2016.05); *H02K 7/183* (2013.01); *H02P 9/007* (2013.01)

(58) Field of Classification Search
CPC ........ H02M 7/487; F03D 17/00; F03D 7/042; H02K 7/183
See application file for complete search history.

(56) References Cited

U.S. PATENT DOCUMENTS

| | | | | |
|---|---|---|---|---|
| 5,953,222 | A * | 9/1999 | Mizutani | H02M 7/003 363/132 |
| 6,392,907 | B1 * | 5/2002 | Ichikawa | H02M 7/487 363/132 |
| 7,339,803 | B2 * | 3/2008 | Nojima | H02M 1/32 361/91.6 |
| 7,508,640 | B2 | 3/2009 | Knapp et al. | |
| 9,543,855 | B2 * | 1/2017 | Soeiro | H02M 7/537 |

(Continued)

OTHER PUBLICATIONS

Z. Chen et al., "A Review of the State of the Art of Power Electronics for Wind Turbines," IEEE Transactions on Power Electronics, vol. 24, No. 8, pp. 1859-1875, Aug. 2009, USA.

(Continued)

*Primary Examiner* — Sean Gugger
(74) *Attorney, Agent, or Firm* — J. Bruce Schelkopf; Taft Stettinius & Hollister LLP

(57) ABSTRACT

Unique systems, methods, techniques and apparatuses of an active neutral point clamped converter (ANPC converter). One exemplary embodiment is a power conversion system comprising a grid-side converter, a DC link, a multi-phase ANPC converter coupled to an electric machine, and an electronic control system. The electronic control system is structured to selectably operate in a first mode and a second mode in response to a device failure state of the ANPC converter, the first mode operating the grid-side converter to provide a first DC link voltage and operating the ANPC converter using a first modulation index, and the second mode operating the grid-side converter to provide a second DC link voltage greater than the first DC link voltage and operating the ANPC converter using a second modulation index lower than the first modulation index.

21 Claims, 3 Drawing Sheets

(56) References Cited

U.S. PATENT DOCUMENTS

| | | | | |
|---|---|---|---|---|
| 9,654,026 | B2* | 5/2017 | Nakashima | H02M 7/537 |
| 2008/0204959 | A1* | 8/2008 | Knapp | H02H 7/1225 |
| | | | | 361/100 |
| 2012/0201059 | A1* | 8/2012 | Berggren | H02H 7/268 |
| | | | | 363/53 |
| 2015/0002106 | A1* | 1/2015 | Inagaki | H02M 5/4585 |
| | | | | 322/79 |

OTHER PUBLICATIONS

R. Pena et al., "Doubly Fed Induction Generator Using Back-to-Back PWM Converters and Its Applications to Variable-Speed Wind-Energy Generation," IEE Proceedings Electric Power Application, vol. 143, No. 3, pp. 231-241, May 1996, Nottingham, UK.

D. Floricau et al., "Natural Doubling of the Apparent Switching Frequency Using Three-Level ANPC Converter," IEEE Nonsinusoidal Currents and Compensation, pp. 1-6, Jun. 2008, Lagow, Poland.

J. Li et al., "Three-Level Active Neutral-Point-Clamped (ANPC) Converter with Fault Tolerant Ability," IEEE Applied Power Electronics Conference and Exposition 2009, pp. 840-845, Feb. 2009, Raleigh, North Carolina.

P. Fazio et al., "Fault Detection and Reconfiguration Strategy for ANPC Converters," 15th International Power Electronics and Motion Control Conference Sep. 4, 2012, Serbia, 5 pgs.

J. He et al., "Diagnosis of Open-Circuits Switch Faults in Multilevel Active-NPC (ANPC) Inverters," IEEE Transportation Electrification Conference and Exposition 2014, pp. 1-6, Jun. 15, 2014, Milwaukee, Wisconsin.

* cited by examiner

ACTIVE NEUTRAL POINT CLAMPED CONVERTER CONTROL SYSTEM AND METHOD

BACKGROUND

The present disclosure relates generally to power converter control systems. Power converters including switches such as semiconductor devices may malfunction by open or short circuiting, or failing to respond to an activation signal among other failure modalities. In some applications, a semiconductor device failure may cause a power converter to cease operation entirely, causing costly, inconvenient and perhaps dangerous system downtime. Existing power converter control systems suffer from a number of shortcomings and disadvantages including those respecting power converter control during semiconductor device failure events, decreasing operating costs, and increasing converter robustness. For example, a power converter controlling the rotor of a doubly fed induction generator (DFIG) driven by a wind turbine may fail due to a malfunctioning semiconductor device, causing the wind turbine to be taken offline until the converter is fixed. Similar concerns may arise in other contexts including, for example, hydroelectric turbine-machine-converter systems and in connection with other types of machines such as induction motors. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for a power converter control system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
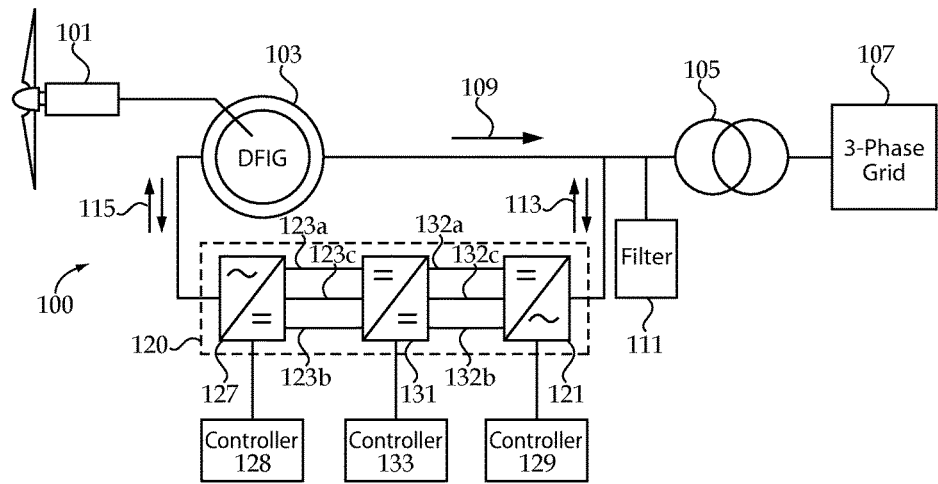
FIG. 1 illustrates an exemplary power generation system.

With reference to FIG. 1 there is illustrated an exemplary power generation system 100 including a power converter 120. In the illustrated embodiment, power generation system 100 is structured as a wind turbine-based power generation system. It shall be appreciated that power system 100 may also be structured as a hydroelectric turbine-based power generation system. It shall be further appreciated that converter 120 may be implemented in a variety of applications, including variable state drives, frequency changers, and other applications where AC/AC power converters are used to name but a few examples.

System 100 includes a wind turbine 101 structured to convert wind into rotational movement. Wind turbine 101 is mechanically coupled to a doubly fed induction generator (DFIG) 103 including a rotor and a stator. DFIG 103 is structured to be driven by the rotational movement generated by turbine 101 with the rotor. The movement of the rotor generates electric power in the stator. A utility grid 107 is electrically coupled to the stator of DFIG 103 by way of a transformer 105 and a filter 111. Utility grid 107 receives power with a current 109 from the DFIG 103.

Converter 120 is structured to control the angular speed or torque of the rotor by controlling a current 115 provided to the rotor of DFIG 103. The speed or torque of the rotor may be controlled so that stress on the mechanical components of system 100 is reduced, output power is increased, and acoustical noise is reduced. In certain embodiments, converter 120 provides current 115 to the rotor and receives current 115 from the rotor.

Converter 120 includes a grid side converter 121, a DC bus including three lines 132a-132c, another DC bus including three lines 123a-123c, and a rotor side converter 127. Grid side converter 121 is electrically coupled to DC bus lines 132a-132c. Grid side converter 121 includes a plurality of semiconductor devices. In the illustrated embodiment, the semiconductor devices include switches, specifically insulated gate bipolar transistors (IGBTs), electrically coupled in an anti-parallel formation with a freewheeling diode. In other embodiments, the semiconductor switches may include bipolar junction transistors (BJTs), metal oxide semiconductor field effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switch structured to selectively control the flow of electric current. In embodiments where the semiconductor switch is bi-directional, the semiconductor devices may not include a freewheeling diode. Semiconductor devices of converter 121 may be arranged in any topology structured to convert DC power to AC power and convert AC power to DC power. For example, the topology of converter 121 may be a neutral point clamped configuration, a cascade configuration, a flying capacitor configuration, an active neutral point clamped configuration, an H-bridge configuration, or another converter configuration structured to generate at least a two level voltage output. It shall be appreciated that any or all of the foregoing features of converter 121 may also be present in the other converters disclosed herein unless otherwise specified.

In the illustrated embodiment, converter 120 includes a DC/DC converter 131 electrically coupled to grid side converter 121 by way of lines 132a-132c. In certain embodiments, line 132a transmits power with a positive DC voltage, line 132b transmits power with a negative DC voltage, and line 132c is a neutral line. In certain embodiments, DC bus lines 132c is coupled to grid side converter 121 and rotor side converter 127, bypassing DC/DC converter 131. DC/DC converter 131 is structured to receive DC power from grid side converter 121, step up the voltage of the received DC power, and provide the converted DC power to DC bus lines 123a-123c. DC/DC converter 131 may also receive DC power from DC bus lines 123a-123c, step up or step down the voltage of the received DC power, and provide the converted DC power to converter 121.

In other embodiments, converter 120 includes DC bus line 132a and DC bus line 132b coupled between grid side converter 121 and DC/DC converter 131, as well as a DC link capacitor coupled to DC bus lines 132a and DC bus lines 132b. The DC link includes at least one capacitor structured to reduce transients and balance the voltages on DC bus lines 132a and 132b.

Rotor side converter 127 is electrically coupled to DC/DC converter 131 by way of DC bus lines 123a-123c, as well as the rotor of DFIG 103. In certain embodiments, line 123a transmits power with a positive DC voltage, line 123b transmits power with a negative DC voltage, and line 123c is a neutral line. Converter 127 is structured with an active neutral point clamped configuration. Converter 120 may either provide AC power to the rotor or receive AC power from the rotor.

Grid side converter 121 is controlled by a controller 129, rotor side converter is controlled by a controller 128, and DC/DC converter 131 is controlled by a controller 133. Controller 128 is structured to provide a plurality of activation signals to rotor side converter 127 so as to open and close the switches of converter 127. It shall be appreciated that any or all of the foregoing features of controller 128 may also be present in the other controllers disclosed herein. In certain embodiments, controller 128, controller 129, and controller 133 are components of a single electronic control unit structured to separately perform the operations described herein, though they may also be components of multiple electronic control units. In certain embodiments controllers 128, 129, and 133 may share certain circuitry, though they may also be independent and separate.

As discussed in more detail below, when controllers 128 and 129 operate converters 127 and 121 respectively so as to provide a current 115 to the rotor, grid side converter 121 is structured to receive AC power from the stator with a current 113 and convert the AC power to DC power. DC bus 123 is structured to receive the DC power from grid side converter 121. Rotor side converter 127 is structured to receive DC power from DC bus 123, convert the DC power to AC power, and provide the AC power with a current 115 to the stator of the DFIG 103.

When controllers 128 and 129 operate converters 127 and 121 respectively so as to receive AC power from the rotor with current 115, converter 127 receives the AC power and converts the AC power to DC power. DC bus 123 is structured to receive the DC power from rotor side converter 121. Grid side converter 121 is structured to receive DC power from DC bus 123, convert the DC power to AC power, and provide AC power with a current 113 two grid 107.

In a normal operation mode, the switching devices of converters 121 and 127 are fully functioning. Controller 129 operates converter 121 so as to produce a DC power with a nominal voltage $V_{dc}$ and controller 128 operates converter 127 so as to receive the DC power and produce multiphase AC power. Controller 133 may operate so as to step up or step down the voltage of the power transferred between converter 121 and converter 127.

In a first semiconductor switch fault mode, converter 127 may continue to partially operate during a semiconductor switch fault condition, when one of the semiconductor devices of converter 127 fails. During the first semiconductor switch fault mode, controller 128 is structured to couple the phase output of converter 127 with the faulty semiconductor device to the neutral point of ANPC converter 127 and modify the power output of the remaining phases with fully functioning semiconductor devices. In certain embodiments, controller 133 may be structured to receive DC power from converter 121 and operate DC/DC converter 131 so as to step up the voltage of DC power, and provide the DC power with the stepped up voltage to converter 127. For example, controller 133 may operate DC/DC converter 133 to increase the voltage of the DC power provided to converter 127 to 110% of $V_{dc}$. In another example, controller 133 may operate DC/DC converter 133 to increase the voltage of the DC power provided to converter 127 to greater than 125% of $V_{dc}$. In certain embodiments, controller 129 is structured to operate converter 121 so as to increase the output voltage of the DC power higher than $V_{dc}$. For example, controller 129 may operate converter 121 to increase the output voltage of the DC power to 110% of $V_{dc}$. In another example, controller 129 may operate converter 121 to increase the output voltage of the DC power to greater than 125% of $V_{dc}$.

In certain embodiments where the topology of converter 121 is an active neutral point clamped configuration, system 100 may respond to the failure of a semiconductor device of converter 121 in a second semiconductor switch fault mode. During the second semiconductor switch fault mode, controller 129 is structured to couple the phase input of converter 121 with the faulty semiconductor device to the neutral point of converter 121 and modify the voltage of the DC output. In certain embodiments, where converter 121 receives multiphase AC power, controller 129 may respond to a converter 121 semiconductor switch failure by increasing the output voltage for the portion of converter 121 functioning normally. For example, if converter 121 receives three phase power and the portion of the converter receiving the first phase power input experiences a semiconductor device failure, the semiconductor switches of converter 121 receiving and converting the second and third phase inputs to DC power are operated by controller 129 so as to increase the DC output voltage to $V_{dc}$ times the square root of three.

In certain embodiments controller 133 is structured to operate DC/DC converter 131 so as to receive the DC power from converter 121 with the reduced voltage, step up the voltage of the DC power, and output the DC power with the stepped up voltage to converter 127. For example, DC/DC converter 131 may step the voltage of the received DC power to $V_{dc}$ times the square root of three.

In a third semiconductor switch fault mode, a semiconductor device of converter 121 may fail at the same time a semiconductor device of converter 127 fails. Controllers 128, 129, and 133 operate converters 127, 131, and 121, respectively, in the manner described with respect to the first semiconductor switch fault mode and the second semiconductor switch fault mode. Controller 129 operates the partially functioning converter 121 so as to output DC power with a voltage greater than or equal to $V_{dc}$ times the square root of three. Controller 133 may operate DC/DC converter 131 so as to receive the DC power from converter 121, step up the voltage of the received DC power, and output DC power with the stepped up voltage. Controller 128 operates converter 127 so as to receive the DC power from converters 131 and 121, couple the phase output of converter 127 with the faulty semiconductor device to the neutral point of converter 127, and modify the power output of the remaining phases with fully functioning semiconductor devices. Since converters 121 and 127 are both experiencing semiconductor failures, controller 133 operates DC/DC converter 133 so as to balance voltages of the DC power.

In other embodiments, converter 120 includes grid side converter 121 and rotor side converter 127. Since converter 120 does not include a DC/DC converter, converters 121 and 127 are electrically coupled by way of DC bus lines 132a-132c. In the normal operating mode, controller 129 operates converter 121 so as to produce DC power with a nominal voltage $V_{dc}$ and controller 128 operates converter 127 so as to receive the DC power and output multiphase AC power. In the first semiconductor switch fault mode, controller 128 is structured to couple the phase output of converter 127 with the faulty semiconductor device to the neutral point of ANPC converter 127 and modify the power output of the remaining phases with fully functioning semiconductor devices. Controller 129 may operate converter 121 so as to increase the output voltage of the DC power higher than $V_{dc}$, as described above. During the second semiconductor fault mode where converter 121 is an active neutral point clamped converter and receives multiphase AC power, controller 129 increases the output voltage of portion of converter 121 functioning normally, as described above, to $V_{dc}$ times the square root of three. During the third semiconductor switch fault mode, controllers 128 and 129 operate converters 127 and 121, respectively, in the manner described with respect to the first semiconductor switch fault mode and the second semiconductor switch fault mode. Controller 128 is structured to couple the phase output of converter 127 with the faulty semiconductor device to the neutral point of ANPC converter 127 and modify the power conversion operation for the remaining phases received with fully functioning semiconductor devices. Controller 129 increases the output voltage of the portion of converter 121 coupled to the remaining phases to $V_{dc}$ times the square root of three. It shall be appreciated that any or all of the foregoing features of system 100 may also be present in the other systems disclosed herein.

Figure 2:
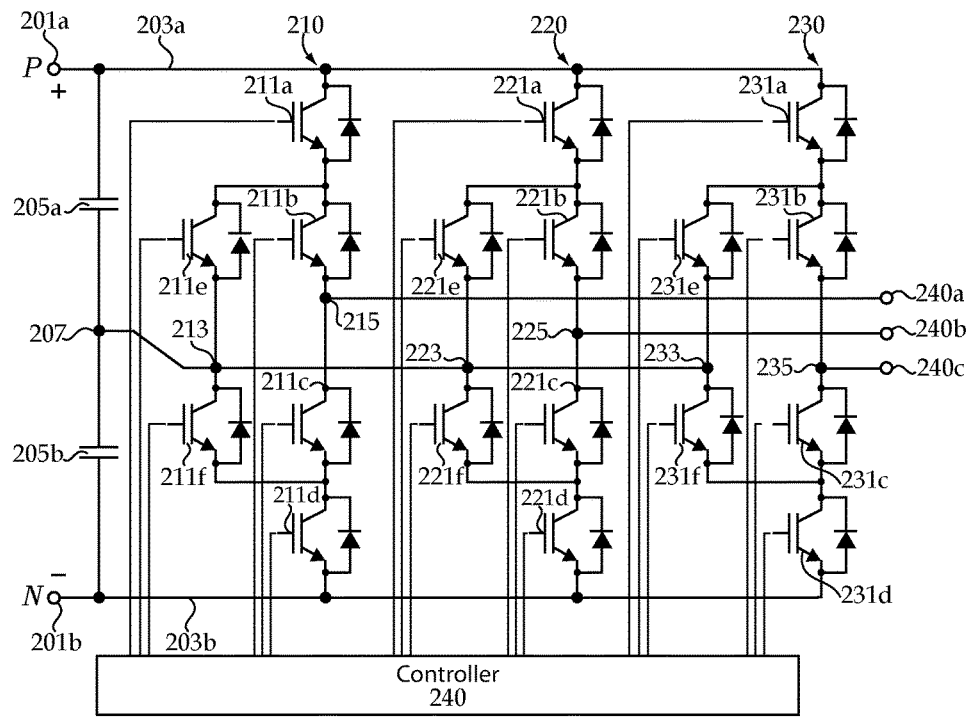
FIG. 2 illustrates an exemplary ANPC converter.

With reference to FIG. 2 there is illustrated an exemplary three level ANPC converter 200, such as rotor side converter 127 of FIG. 1. In the illustrated embodiment, converter 200 is a bidirectional three phase converter. In certain embodiments, converter 200 may be a unidirectional multi-phase converter structured to convert DC power to multi-phase AC power other than three phase power.

Converter 200 is electrically coupled to a DC power source. In the illustrated embodiment, converter 200 includes terminals 201a and 201b electrically coupled to the power source. A first DC bus rail 203a is electrically coupled to terminal 201a and a second DC bus rail 203b is electrically coupled to terminal 201b. A pair of capacitors 205a and 205b are electrically coupled in series between DC bus rails 203a and 203b at a midpoint connection 207 structured as a neutral point. Midpoint connection may be coupled to a third DC bus rail structured as a neutral line. Capacitors 205a and 205b are structured such that the voltage at midpoint connection 207 is 0 V. Converter 200 includes three legs 210, 220, and 230 are electrically coupled between DC bus rails 203a and 203b.

Leg 210 includes semiconductor devices 211a-211f, each of which includes a semiconductor switch and a freewheeling diode. Semiconductor device 211a includes a first terminal electrically coupled to DC bus 203a and a second terminal electrically coupled to a first terminal of device 211b. A second terminal of device 211b is electrically coupled to a first terminal of device 211c. A second terminal of device 211c is electrically coupled to a first terminal of device 211d and a second terminal of device 211d is electrically coupled to DC bus rail 203b. A first terminal of device 211e is electrically coupled to the second terminal of device 211a and the first terminal of device 211b. A second terminal of device 211e is electrically coupled to the first terminal of device 211f. The second terminal of device 211f is electrically coupled to the second terminal of device 211c and the first terminal of device 211d. A connection point 213 electrically coupled between the second terminal of 211e and the first terminal 211f is also electrically coupled to the midpoint connection 207. A connection point 215 electrically coupled between the second terminal of device 211b in the first terminal device 211c is also electrically coupled to an output 240a.

Leg 220 includes semiconductor devices 221a-211f, each of which includes a semiconductor switch and a freewheeling diode. Semiconductor device 221a includes a first terminal electrically coupled to DC bus 203a and a second terminal electrically coupled to a first terminal of device 221b. A second terminal of device 221b is electrically coupled to a first terminal of device 221c. A second terminal of device 221c is electrically coupled to a first terminal of device 221d and a second terminal of device 221d is electrically coupled to DC bus rail 203b. A first terminal of device 221e is electrically coupled to the second terminal of device 221a and the first terminal of device 221b. A second terminal of device 221e is electrically coupled to the first terminal of device 221f. The second terminal of device 221f is electrically coupled to the second terminal of device 221c and the first terminal of device 221d. A connection point 223 electrically coupled between the second terminal of 221e and the first terminal 221f is also electrically coupled to the midpoint connection 207. A connection point 225 electrically coupled between the second terminal of device 221b in the first terminal device 221c is also electrically coupled to an output 240b.

Leg 230 includes semiconductor devices 231a-211f, each of which includes a semiconductor switch and a freewheeling diode. Semiconductor device 231a includes a first terminal electrically coupled to DC bus 203a and a second terminal electrically coupled to a first terminal of device 231b. A second terminal of device 231b is electrically coupled to a first terminal of device 231c. A second terminal of device 231c is electrically coupled to a first terminal of device 231d and a second terminal of device 231d is electrically coupled to DC bus rail 203b. A first terminal of device 231e is electrically coupled to the second terminal of device 231a and the first terminal of device 231b. A second terminal of device 231e is electrically coupled to the first terminal of device 231f. The second terminal of device 231f is electrically coupled to the second terminal of device 231c and the first terminal of device 231d. A connection point 233 electrically coupled between the second terminal of 231e and the first terminal 231f is also electrically coupled to the midpoint connection 207. A connection point 235 electrically coupled between the second terminal of device 231b in the first terminal device 231c is also electrically coupled to an output 240b.

Converter 200 includes a controller 240 electrically coupled to each of semiconductor devices 211a-211f, 221a-221f, and 231a-231f. Controller 240 is structured to generate a plurality of activations signals and transmit the plurality of activation signals to each of semiconductor devices 211a-211f, 221a-221f, and 231a-231f. Controller 240 is also structured to detect a semiconductor switch failure, such as a short circuit and an open circuit fault.

Figure 3:
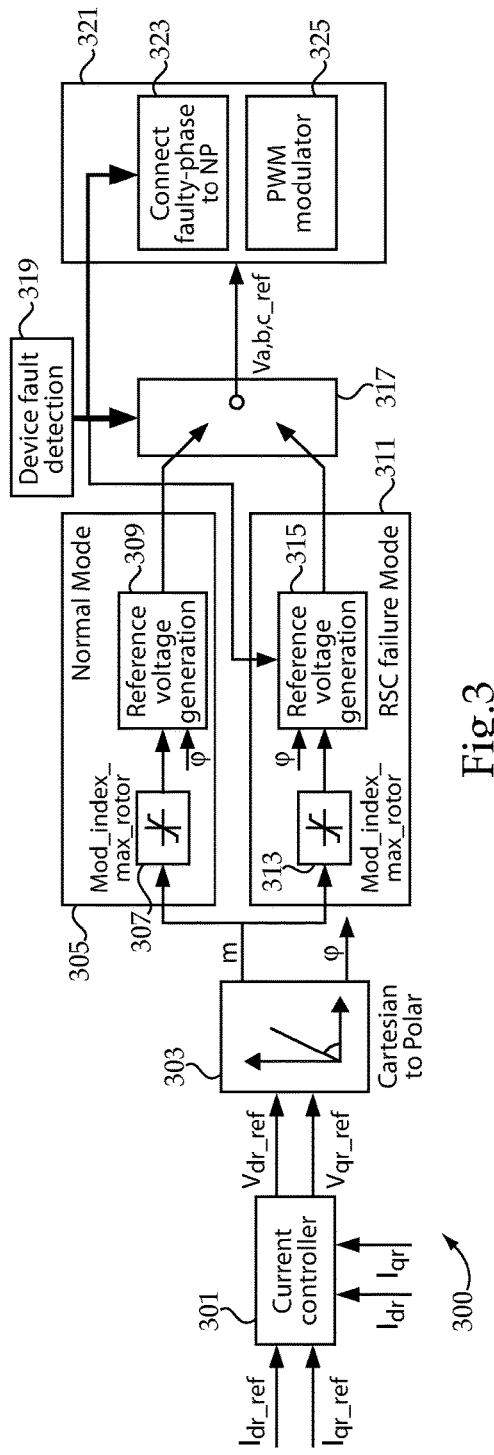
FIG. 3 is a block diagram illustrating an exemplary control system for the ANPC converter of FIG. 2.

With reference to FIG. 3 there is a block diagram illustrating an electronic control system 300, which may comprise one or more controllers, such as controllers 128, 129, and 131 in FIG. 1. System 300 includes a current controller structured to receive the d-axis rotor current reference value $I_{dr\_ref}$, the q-axis rotor current reference value $I_{qr\_ref}$, and a measured rotor current value including a d-axis component $I_{dr}$ and a q-axis component $I_{qr}$. The q-axis rotor current reference value $I_{qr\_ref}$ is generated using a command reference generated by the DFIG controller to achieve maximum power point tracking. The d-axis rotor current reference value $I_{dr\_ref}$ is calculated using the reactive power controller. Using the received values, current controller 301 calculates a voltage reference value having a d-axis component $V_{dr\_ref}$ and a q-axis component $V_{qr\_ref}$. A value conversion module 303 receives the voltage reference value in Cartesian form and converts the voltage reference value to polar form, including a modulation index m and a phase angle φ.

The modulation index m is received by a normal mode module 305 and a semiconductor switch failure module 311. The normal mode module 305 receives the modulation index m at the modulation index maximum module 307 and is structured to determine the modulation index limit during normal operation, with an absolute upper modulation index limit of 1. The calculation of module 307 is transmitted to a reference voltage generation module 309 which also receives phase angle φ. Reference voltage generation module 309 calculates a voltage reference value which is output to a voltage reference selection module 317. The reference voltage signals generated by module 305 can be expressed with the following equations, where ω is the angular frequency:

$$V_{a\_ref} = m \times \cos(\omega t + \varphi) \quad (1)$$

$$V_{b\_ref} = m \times \cos(\omega t + \varphi - 2\pi/3)$$

$$V_{c\_ref} = m \times \cos(\omega t + \varphi + 2\pi/3)$$

Semiconductor switch failure module 311 is structured to receive the modulation index m at a modulation index maximum module 313. Using the modulation index m, maximum module 313 calculates the modulation index limit during a semiconductor switch failure event, with an absolute upper modulation index limit of one divided by the square root of three. The calculation of module 313 is transmitted to a reference voltage generation module 315, which also receives phase angle φ. Module 315 calculates reference voltage values which are transmitted to the voltage reference selection module 317. The reference voltage signals generated by module 305 can be expressed with the following equations, assuming a the faulty device is associated with the phase a output:

$$V_{a\_ref} = 0 \quad (2)$$

$$V_{b\_ref} = -\sqrt{3} \times m \times \cos(\omega t + \varphi + \pi/6)$$

$$V_{c\_ref} = \sqrt{3} \times m \times \cos(\omega t + \varphi + 5\pi/6)$$

Device fault detection module 319 locates any of the semiconductor devices of the converter experiencing a fault condition. If module 319 does not detect a fault condition, module 317 selects the reference voltage values generated by normal mode module 305. If module 319 does detect a fault condition, module 317 selects the reference voltage values generated by the semiconductor switch failure module 311. In certain embodiments, module 317 determines whether a fault condition is occurring and requests an output from either module 305 or module 311. Activation signal generation module 321 receives the selected voltage reference values from module 317. Module 321 includes a pulse width modulation modulator 325 which uses the voltage reference values received from module 317 to generate activations signals.

When device fault detection module 319 detects a semiconductor switch fault, a faulty-phase activation signal generation module 323 is structured to generate an activation signal for the phase corresponding to the semiconductor device experiencing a fault condition such that the corresponding output is electrically coupled to the neutral point, such as the midpoint connection 207 in FIG. 2. For example, if one of the semiconductor devices 211a-211f experiences an open circuit fault condition, controller 240 is structured to open devices 211a and 211d and close devices 211b, 211c, 211e, and 211f. If semiconductor device 211a experiences a short circuit, controller 240 is structured to open semiconductor devices 211b, 211d, and 211e and close semiconductor devices 211c and 211f. If semiconductor device 211d experiences a short circuit, controller 240 is structured to open devices 211a, 211c, and 211f and close devices 211b and 211e. If one of devices other than 211a and 211d experience a short circuit, controller 240 is structured to open devices 211a and 211d and close the remaining functioning devices.

Figure 4:
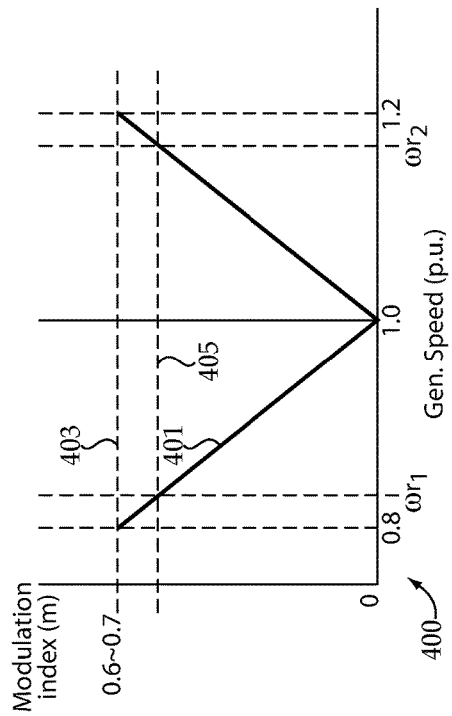
FIG. 4 is a graph illustrating the modulation index curve for the wind turbine control system of FIG. 1.

With reference to FIG. 4 there is illustrated a modulation index curve of the rotor side converter 127 in FIG. 1. Line 401 represents the modulation value at different rotor speeds expressed in per unit for achieving maximum power point tracking (MPPT). In normal operating mode, the maximum limit of the modulation index is approximately 0.7, shown by line 403. As wind speed changes, the rotor speed is controlled to achieve maximum power point tracking.

In semiconductor switch failure mode, the maximum limit of the modulation index, without a voltage increase above $V_{dc}$, is one divided by the square root of three, as shown by line 405. When maximum power point tracking dictates the rotor speed should be between 0.8 and $\omega r_1$ or between $\omega r_2$ and 1.2, the required modulation index is higher than the available maximum modulation index. MPPT is only achievable for the rotor speed range of $\omega r_1$ to $\omega r_2$. By increasing the DC voltage above $V_{dc}$, DFIG 103 can perform as if it is not restricted by the maximum modulation index of one divided by the square root of three.

In order to expand the operating range available for MPPT operation, the voltage of the DC power received by the rotor side converter 127 is increased by operating the grid side converter 121 and/or the DC/DC converter 131. For example, for a system where $V_{dc}$ is 1070 V, by increasing the voltage of the DC-bus to 110% $V_{dc}$, DFIG 103 of system 100 will operate as if converter 120 is operating under normal conditions using a modulation index of approximately 0.64. By increasing the voltage of the DC-bus to 120% $V_{dc}$, DFIG 103 of system 100 will operate as if converter 120 is operating under normal conditions using a modulation index of approximately 0.69. By increasing the voltage of the DC-bus to 125% $V_{dc}$, DFIG 103 of system 100 will operate as if converter 120 is operating under normal conditions using a modulation index of approximately 0.72.

Figure 5:
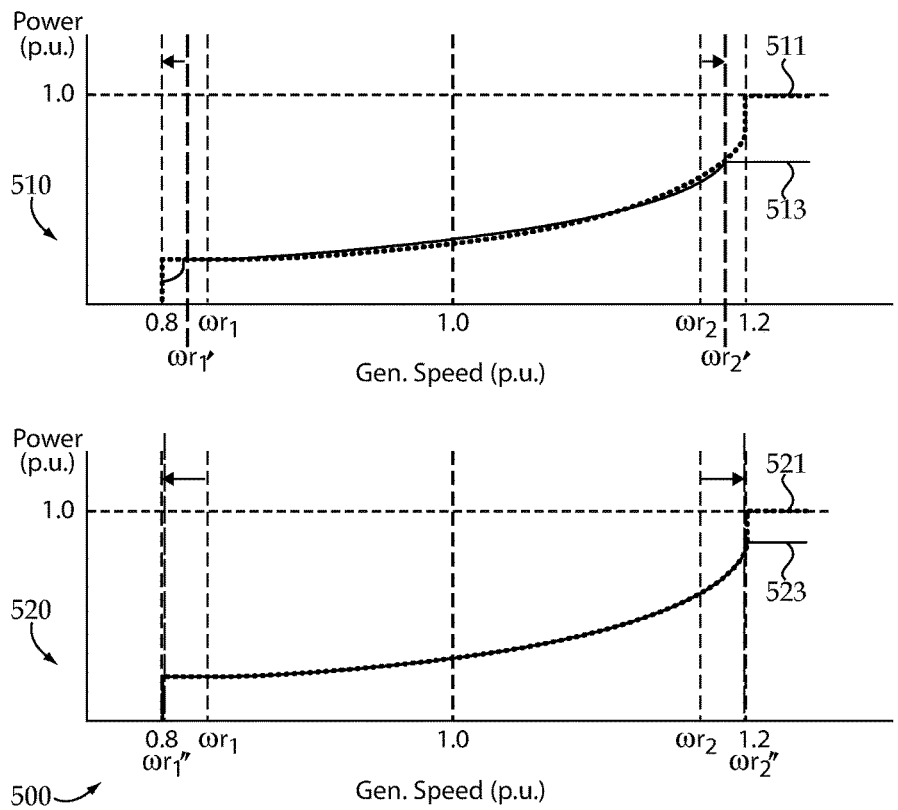
FIG. 5 is a plurality of graphs illustrating two power curves produced by the exemplary power generation system of FIG. 1.

With reference to FIG. 5 there a plurality of graphs 500 illustrating a power curve of the power generating system 100 of FIG. 1. Graph 510 illustrates the power output of system 100 during normal operation and a fault. Graph 510 includes a line 511 representing the power output of system 100 during normal operation and a line 513 representing the power output of system 100 during a rotor side converter 127 fault condition in which the DC bus voltage $V_{dc}$ has been increased by 10%. Graph 520 includes a line 521 representing the power output of system 100 during normal operation and a line 523 representing the power output of system 100 during a rotor side converter 127 fault condition in which the DC bus voltage $V_{dc}$ has been increased by 20%. As illustrated by the plurality of graphs 500, as the DC bus voltage $V_{dc}$ is increased, the output power of system 100 during fault mode becomes closer to the output power of system 100 during normal operation because the operating speed range of the rotor is increased.

Figure 6:
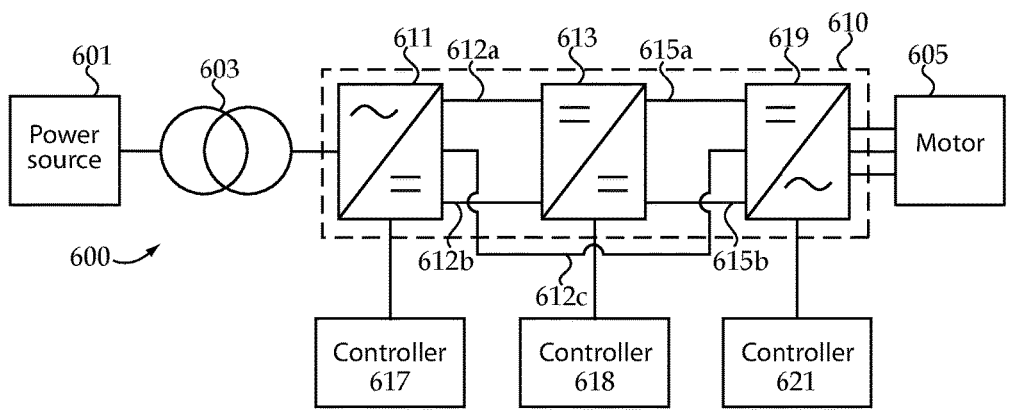
FIG. 6 illustrates an exemplary electric motor system.

With reference to FIG. 6, there is illustrated an exemplary motor system 600 including a motor drive 610. Drive 610 may be a high voltage motor drive, medium voltage motor drive, or a low voltage motor drive. Drive 610 is coupled to a power source 601 by way of a transformer 603. In other embodiments, system 600 may not include transformer 603. Power source 601, such as a utility grid, may be structured to provide single phase or multi-phase power to drive 610. Drive 610 is also coupled to an electric motor 605. In the illustrated embodiment, drive 610 is structured to provide three phase AC power to motor 605. In other embodiments, drive 610 is structured to provide single phase AC power or multiphase AC power other than three phase AC power to motor 605.

Drive 610 includes three converters 611, 613, and 619, each including a plurality of switching devices, coupled by way of DC bus lines 612a-612c and 615a-615b. AC/DC converter 611 is coupled to transformer 603. DC/DC converter 613 is coupled to converter 611 by way of DC bus lines 612a and 612b. DC/DC converter 613 is coupled to ANPC converter 619 by way of DC bus lines 615a and 615b. Converter 619 is coupled to converter 611 by way of DC bus line 612c. DC bus lines 612a and 615a may transmit DC power with a positive DC voltage, DC bus lines 612b and 615b may transmit DC power with a negative DC voltage and DC bus line 612c may be a neutral line. In other embodiments, DC/DC converter 613 is operatively coupled to DC bus line 612c between converter 611 and 619.

In certain embodiments, drive 610 includes converters 611, 613, and 619 operatively coupled by way of two DC bus lines. A DC link capacitor is coupled between the DC bus lines.

Drive 610 is controlled by controllers 617, 618, and 621. In certain embodiments, controllers 617, 618, and 621 are a single controller structured to perform the operations of the controllers of system 600 described herein. It shall be appreciated that the any or all of the features described with respect to controllers 129, 133, and 128 of system 100 in FIG. 1 may be present in controllers 617, 618, and 621, respectively.

In a normal operating mode, Controller 617 is configured to operate converter 611 so as to receive AC power from power source 601, convert the AC power to DC power with a nominal voltage $V_{dc}$, and output the DC power. Controller 621 is configured to operate converter 619 so as to receive DC power, convert the DC power to AC power, and output the converted AC power to motor 605. Controller 618 may be configured to operate converter 613 so as to receive power from converter 611, step up the voltage of the DC power, and output the DC power with the stepped up voltage.

Controllers 617, 618, and 621 may be configured to operate in three fault modes, each fault mode corresponding to a semiconductor switch fault mode described with respect to system 100 in FIG. 1. During a first fault mode, corresponding to the first semiconductor switch fault mode of system 100, a switching device failure occurs in converter 619. As described in more detail above, controller 621 is configured to couple the phase output of converter 619 with the faulty semiconductor device to the neutral point of converter 619 and modify the power output of the remaining phases with fully functioning semiconductor devices. In certain embodiments, controller 618 operates converter 613 so as to receive DC power with the nominal voltage $V_{dc}$ from converter 611, step up the voltage of the received DC power, and output the DC power with the increased voltage. The increased voltage may be substantially greater than the nominal voltage in order for motor 605 to perform as if motor 610 was being operated by drive 610 under normal operating mode. For example, the increased voltage may be at least 50% higher than the nominal voltage $V_{dc}$.

During a second fault mode, corresponding to the second semiconductor switch fault mode of system 100, a switching device failure occurs in converter 611 which has an active neutral point clamped topology. Controller 617 is configured to couple the phase input of converter 611 received with the faulty switching device to a neutral point of converter 611. In certain embodiments, where converter 617 receives multiphase AC power, controller 617 may increase the output voltage of converter 611 to $V_{dc}$ times the square root of three, as described in detail above.

During a third fault mode, corresponding to the third semiconductor switch fault mode of system 100, a switching device failure occurs in converters 611 and 619. Controllers 617, 618, and 621 operate converters 611, 613, and 619, respectively, in the manner described with respect to the first fault mode and the second fault mode. Controller 617 operates converter 611 so as to output DC power with a voltage of $V_{dc}$ times the square root of three by increasing the output voltage of the fully functioning legs. Controller 619 may operate DC/DC converter 613 so as to receive the DC power from converter 611, step up the voltage of the received DC power, and output DC power with the stepped up voltage. Controller 621 operates converter 619 so as to receive the DC power with increased voltage, couple the phase output of converter 127 with the faulty semiconductor device to the neutral point of converter 127 and modify the operation of the switching devices providing power to the remaining phases.

In certain embodiments, drive 610 includes an AC/DC converter 611 and an ANPC converter 619 coupled by way of DC bus lines 612a-612c. In the normal operating mode, controller 619 operates converter 611 so as to output DC power with nominal voltage $V_{dc}$ and controller 621 operates converter 619 so as to receive the DC power and produce multiphase AC power. During the first fault mode, controller 621 is structured to couple the phase output of converter 619 with the faulty semiconductor device to the neutral point of ANPC converter 619 and modify the power output of the remaining phases with fully functioning semiconductor devices. Controller 617 operates converter 611 so as to increase the output voltage of the DC power higher than $V_{dc}$, as described above. During the second fault mode, where converter 611 is an active neutral point clamped converter and receives multiphase AC power, controller 617 increases the output voltage using the portion of converter 611 functioning normally to $V_{dc}$ times the square root of three and couples the portion of converter 611 with a faulty semiconductor device to the neutral point of converter 611. During the third semiconductor switch fault mode, controllers 617 and 621 operate converters 611 and 619, respectively, in the manner described with respect to the first fault mode and the second fault mode. Controller 621 is structured to couple the phase output of converter 619 with the faulty switching device to the neutral point of converter 619 and modify the power conversion operation of the remaining phases with fully functioning switching devices. Controller 617 increases the output voltage of converter 611, as described above, in order for converter 611 to output DC power with a voltage output equal to or greater than $V_{dc}$ times the square root of three.

Further written description of a number of exemplary embodiments shall now be provided. One embodiment is a control system for an electric machine including a stator and a rotor, the control system comprising a first converter including a first plurality of switching devices and structured to be operatively electrically coupled to a power grid; a DC bus structured to receive the DC power from the first converter; a multi-phase active neutral point clamped converter (ANPC converter) including a second plurality of switching devices, operatively electrically coupled with the electric machine and the DC bus; and an integrated-circuit based electronic control system comprising first control components structured to operate the first converter by transmitting a first plurality of activation signals to the first plurality of switching devices of the first converter such that the first converter converts the received power to DC power at a first voltage, to detect a failure of one of the second plurality of the switching devices of the ANPC converter, and to operate the first converter by transmitting the first plurality of activation signals to the first plurality of switching devices of the first converter such that the first converter converts the received power to DC power at a second voltage greater than the first voltage in response to detecting a failure of one of the second plurality of the switching devices of the ANPC converter; and second control components structured to operate the ANPC converter by transmitting a second plurality of activation signals to the second plurality of switching devices of the ANPC converter such that the converter converts the received DC power with the first voltage to AC power and provides the AC power to the electric machine, to detect a failure of one of the second plurality of switching devices of the ANPC converter, and to modify the transmitted second plurality of the activation signals in response to detecting a failure of one of the second plurality of switching devices of the ANPC converter.

In certain forms of the foregoing system, the second plurality of the activation signals transmitted by the second control components are generated using pulse width modulation including a modulating signal including a first signal amplitude. In certain forms, the second plurality of the activations signals transmitted to the ANPC converter are structured to couple the output of the phase with the failed switching devices to the neutral point of the ANPC converter. In certain forms, the second plurality of the activations signals transmitted to the ANPC converter are modified by reducing the amplitude of the modulation index to an amount less than or equal to the first amplitude of the modulating signal divided by the square root of three. In certain forms, the electric machine is a doubly fed induction generator (DFIG). In certain forms, the first converter comprises an AC/DC converter and a DC/DC converter. In certain forms, the first converter includes an active neutral point clamped converter and the first control components are additionally structured to detect a failure of one of the first plurality of switching devices of the AC/DC converter of the first converter, and to operate the DC/DC converter of the first converter by transmitting a portion of the first plurality of activation signals to the first plurality of switching devices of the DC/DC converter of the first converter such that the DC/DC converter converts the received power to DC power at the second voltage in response to detecting a failure of one of the second plurality of the switching devices of the ANPC converter.

Another exemplary embodiment is a power conversion system comprising a power source-side converter structured to be operatively coupled to a power source; a DC link operatively coupled with the power source-side converter; a multi-phase active neutral point clamped converter (ANPC converter) operatively coupled with the DC link structured to be operatively coupled with an electrical machine; and an electronic control system structured to selectably operate in a first mode and a second mode in response to a device failure state of the ANPC converter, the first mode operating the power source-side converter to provide a first DC link voltage and operating the ANPC converter using a first modulation index, and the second mode operating the power source-side converter to provide a second DC link voltage greater than the first DC link voltage and operating the ANPC converter using a second modulation index lower than the first modulation index.

In certain forms of the foregoing system, the ANPC converter comprises a plurality of semiconductor switches and the electronic control system is structured to operate the ANPC converter by generating a plurality of activation signals using pulse width modulation and transmitting the plurality of activation signals to the semiconductor switches. In certain forms, generating the plurality of activation signals includes comparing two signals including a modulating signal, and wherein the amplitude of the modulating signal is calculated using the first modulation index in the first mode and the second modulation index in the second mode. In certain forms, the output of one phase of the ANPC converter is electrically coupled to the neutral point in the second mode. In certain forms, the power source-side converter includes an AC/DC converter and a DC/DC converter, and wherein the electronic control system is structured to operate the power-source side converter during the second mode by using the DC/DC converter to increase the DC link voltage. In certain forms, the second DC link voltage is at least 5% greater than the first DC link voltage. In certain forms, the AC/DC converter includes an active neutral point clamped converter and the AC/DC converter includes a plurality of converter legs and the electronic control system is structured to selectably operate in a third mode in response to a leg failure of the AC/DC converter, the third mode operating the converter legs not experiencing a leg failure so as to increase an output voltage for each of the legs such that the power source-side converter provides the first DC link voltage.

A further exemplary embodiment is a method for operating a wind turbine system including a doubly fed induction generator including a stator and a rotor with a first converter structured as a multiphase converter, including a plurality of semiconductor devices, and electrically coupled to the rotor, and a second converter electrically coupled to the first converter, the method comprising receiving electric power with the second converter; converting the received electric power to DC power at a first voltage with the second converter; detecting a semiconductor device fault in the first converter; converting the received electric power to DC power at a second voltage higher than the first voltage with the second converter; receiving the converted DC power at the second voltage with the first converter; and inverting the received DC power at the second voltage with the first converter, such that the output of the phase corresponding to the semiconductor device fault is zero.

In certain forms of the foregoing method, the first converter is a three level active neutral point clamped converter. In certain forms, inverting the received DC power with the first converter includes generating a plurality of activation signals using sinusoidal pulse width modulation and transmitting the plurality of activation signals to the first converter. In certain forms, generating a plurality of activation signals using sinusoidal pulse width modulation includes comparing two signals including a sinusoidal modulating signal, wherein the amplitude of the modulating signal is calculated using a modulation index. In certain forms, the second voltage is at least 25% greater than the first voltage. In certain forms, the modulation index is determined using maximum power point tracking.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A control system for an electric machine including a stator and a rotor, the control system comprising:
   a first converter including a first plurality of switching devices and structured to be operatively electrically coupled to a power grid;
   a DC bus structured to receive DC power from the first converter;
   a multi-phase active neutral point clamped converter (ANPC converter) including a second plurality of switching devices, operatively electrically coupled with the electric machine and the DC bus; and
   an integrated-circuit based electronic control system comprising:
   first control components structured to operate the first converter by transmitting a first plurality of activation signals to the first plurality of switching devices of the first converter such that the first converter converts the received power to DC power at a first voltage, to detect a failure of one of the second plurality of the switching devices of the ANPC converter, and to operate the first converter by transmitting the first plurality of activation signals to the first plurality of switching devices of the first converter such that the first converter converts the received power to DC power at a second voltage greater than the first voltage in response to detecting the failure of one of the second plurality of the switching devices of the ANPC converter; and
   second control components structured to operate the ANPC converter by transmitting a second plurality of activation signals to the second plurality of switching devices of the ANPC converter such that the converter converts the received DC power with the first voltage to AC power and provides the AC power to the electric machine, to detect the failure of one of the second plurality of switching devices of the ANPC converter, and to modify the transmitted second plurality of the activation signals in response to detecting the failure of one of the second plurality of switching devices of the ANPC converter.

2. The control system of claim 1 wherein the second plurality of the activation signals transmitted by the second control components are generated using pulse width modulation including a modulating signal including a first signal amplitude.

3. The control system of claim 2 wherein the second plurality of the activation signals transmitted to the ANPC converter are structured to couple an output of a phase leg of the ANPC converter with the failed one of the second plurality of switching devices to the neutral point of the ANPC converter.

4. The control system of claim 3 wherein the second plurality of the activations signals transmitted to the ANPC converter are modified by reducing the amplitude of the modulation index to an amount less than or equal to the first amplitude of the modulating signal divided by the square root of three.

5. The control system of claim 1 wherein the electric machine is a doubly fed induction generator (DFIG).

6. The control system of claim 1 wherein the first converter comprises an AC/DC converter and a DC/DC converter.

7. The control system of claim 6 wherein the first control components are additionally structured to operate the DC/DC converter of the first converter by transmitting a portion of the first plurality of activation signals to the first plurality of switching devices of the first converter such that the DC/DC converter converts the received power to DC power at the second voltage in response to detecting the failure of one of the second plurality of the switching devices of the ANPC converter.

8. The control system of claim 1 wherein the first converter includes an active neutral point clamped converter and wherein the first control components are additionally structured to detect a failure of one of the first plurality of the switching devices of the first converter, and to operate the first converter by transmitting the first plurality of activation signals to the first plurality of switching devices of the first converter such that the first converter couples a portion of the first plurality of switching devices of the first converter to a neutral point, and such that the remaining portion of the first plurality of switching devices of the first converter converts the received DC power to DC power at a third voltage greater than the first voltage in response to detecting the failure of one of the first plurality of the switching devices of the first converter.

9. A power conversion system comprising:
a power source-side converter structured to be operatively coupled to a power source;
a DC link operatively coupled with the power source-side converter;
a multi-phase active neutral point clamped converter (ANPC converter) operatively coupled with the DC link structured to be operatively coupled with an electrical machine; and
an electronic control system structured to selectably operate in a first mode, and structured to selectably operate in a second mode in response to a device failure state of the ANPC converter, the first mode operating the power source-side converter to provide a first DC link voltage and operating the ANPC converter using a first modulation index, and the second mode operating the power source-side converter to provide a second DC link voltage greater than the first DC link voltage and operating the ANPC converter using a second modulation index lower than the first modulation index.

10. The power conversion system of claim 9 wherein the ANPC converter comprises a plurality of semiconductor switches and the electronic control system is structured to operate the ANPC converter by generating a plurality of activation signals using pulse width modulation and transmitting the plurality of activation signals to the semiconductor switches.

11. The power conversion system of claim 10 wherein generating the plurality of activation signals includes comparing two signals including a modulating signal, and wherein the amplitude of the modulating signal is calculated using the first modulation index in the first mode and the second modulation index in the second mode.

12. The power conversion system of claim 11 wherein the output of one phase of the ANPC converter is electrically coupled to the neutral point in the second mode.

13. The power conversion system of claim 9 wherein the power source-side converter includes an AC/DC converter and a DC/DC converter, and wherein the electronic control system is structured to operate the power-source side converter during the second mode by using the DC/DC converter to increase the DC link voltage.

14. The power conversion system of claim 13 wherein the AC/DC converter includes an active neutral point clamped converter and wherein the AC/DC converter includes a plurality of converter legs and the electronic control system is structured to selectably operate in a third mode in response to a leg failure of the AC/DC converter, the third mode operating the converter legs not experiencing a leg failure so as to increase an output voltage for each of the legs such that the power source-side converter provides DC power with the second DC link voltage equal to the first DC link voltage times the square root of three.

15. The power conversion system of claim 9 wherein the second DC link voltage is at least 5% greater than the first DC link voltage.

16. A method for operating a wind turbine system including a doubly fed induction generator including a stator and a rotor with a first converter structured as a multiphase converter, including a plurality of semiconductor devices, and electrically coupled to the rotor, and a second converter electrically coupled to the first converter, the method comprising:
receiving electric power with the second converter;
converting the received electric power to DC power at a first voltage with the second converter;
detecting a semiconductor device fault in the first converter;
converting the received electric power to DC power at a second voltage higher than the first voltage with the second converter in response to detecting the semiconductor device fault;
receiving the converted DC power at the second voltage with the first converter; and
inverting the received DC power at the second voltage with the first converter, such that zero volts is output by a phase leg of the first converter, said phase leg including the semiconductor device fault.

17. The method of claim 16 wherein the first converter is a three level active neutral point clamped converter.

18. The method of claim 16 wherein inverting the received DC power with the first converter includes generating a plurality of activation signals using sinusoidal pulse width modulation and transmitting the plurality of activation signals to the first converter.

19. The method of claim 18 wherein generating the plurality of activation signals using sinusoidal pulse width modulation includes comparing two signals including a sinusoidal modulating signal, wherein the amplitude of the modulating signal is calculated using a modulation index.

20. The method of claim 19 wherein the second voltage is at least 25% greater than the first voltage.

21. The method of claim 19 wherein the modulation index is determined using maximum power point tracking.

* * * * *